US008636834B2

(12) United States Patent
Fruchart et al.

(10) Patent No.: US 8,636,834 B2
(45) Date of Patent: Jan. 28, 2014

(54) ADIABATIC TANK FOR METAL HYDRIDE

(75) Inventors: Daniel Fruchart, Echirolles (FR);
Michel Jehan, Fessy (FR); Patricia De Rango, Gières (FR); Salvatore Miraglia, Grenoble (FR); Philippe Marty, Saint Martin d'Uriage (FR); Albin Chaise, Fontaine (FR); Sylvain Garrier, Grenoble (FR); Gérard Bienvenu, Viuz-en-Salaz (FR)

(73) Assignees: Centre National de la Recherche Scientifique, Paris (FR); McPhy Energy, La Motte-Fanjas (FR)

( * ) Notice: Subject to any disclaimer, the term of this patent is extended or adjusted under 35 U.S.C. 154(b) by 240 days.

(21) Appl. No.: 13/139,575

(22) PCT Filed: Dec. 16, 2009

(86) PCT No.: PCT/FR2009/001427
§ 371 (c)(1),
(2), (4) Date: Nov. 28, 2011

(87) PCT Pub. No.: WO2010/076415
PCT Pub. Date: Jul. 8, 2010

(65) Prior Publication Data
US 2012/0061397 A1    Mar. 15, 2012

(30) Foreign Application Priority Data
Dec. 16, 2008 (FR) .................................. 08 07087

(51) Int. Cl.
*F17C 11/00* (2006.01)
(52) U.S. Cl.
USPC ............. 96/126; 96/153; 206/0.7; 423/658.2
(58) Field of Classification Search
USPC ............. 96/121, 126, 130, 146, 153; 206/0.7; 423/648.1, 658.2
See application file for complete search history.

(56) References Cited

U.S. PATENT DOCUMENTS 4,134,490 A * 1/1979 Turillon et al. ................ 206/0.7
4,310,601 A * 1/1982 Bernauer et al. .............. 428/566
(Continued)

FOREIGN PATENT DOCUMENTS

EP    0 015 106 A1    9/1980
EP    1 141 618 B1    10/2001
(Continued)

OTHER PUBLICATIONS

International Search Report and Written Opinion from International Patent Application No. PCT/FR2009/001427, filed Dec. 16, 2009.
(Continued)

*Primary Examiner* — Frank Lawrence, Jr.
(74) *Attorney, Agent, or Firm* — Alston & Bird LLP

(57) ABSTRACT

The invention relates to a safe hydrogen-storing tank that is easy to manufacture and enables the quick kinetic absorption of hydrogen, which reduces the variations in volume and has a low cost in terms of material and energy. The invention has the aim of providing a tank for storing hydrogen, including a hydrogen inlet (21) and a hydrogen outlet (22) in fluid communication with at least one solid body (10-11) capable of the exothermal absorption and endothermal desorption of hydrogen, wherein said at least one solid body (10-11) is made of a compacted material containing light metal hydride and a heat-conducting matrix, and wherein said at least one solid body (10-11) is in heat-transfer relation with at least one heat recovery material (42) free from salt or molten-salt compounds and capable of absorbing the heat generated by the hydrogen absorption and of releasing said absorbed heat so as to provide heat for hydrogen desorption.

20 Claims, 4 Drawing Sheets

(56) References Cited

U.S. PATENT DOCUMENTS

| | | | |
|---|---|---|---|
| 4,446,111 A | 5/1984 | Halene et al. | |
| 6,432,176 B1 | 8/2002 | Klos et al. | |
| 7,094,276 B2 * | 8/2006 | Kojima et al. | 96/153 |
| 8,372,184 B2 * | 2/2013 | Zimmermann | 96/108 |
| 2004/0074144 A1 * | 4/2004 | Isogai et al. | 48/174 |
| 2006/0081483 A1 * | 4/2006 | Chen et al. | 206/0.7 |
| 2006/0178266 A1 | 8/2006 | Yen et al. | |
| 2010/0266488 A1 * | 10/2010 | De Rango et al. | 423/648.1 |
| 2010/0326992 A1 * | 12/2010 | De Rango et al. | 220/581 |

FOREIGN PATENT DOCUMENTS

| | | |
|---|---|---|
| FR | 2 508 596 | 12/1982 |
| WO | WO 00/43103 | 7/2000 |

OTHER PUBLICATIONS

Klein H-P et al: "Heat transfer characteristics of expanded graphite matrices in metal hydride beds"; International Journal of Hydrogen Engery, Elsevier Science Publishers B.V., Barking, GB, vol. 29, No. 14; Nov. 1, 2004; pp. 1503-1511, XP004525400.

* cited by examiner

ADIABATIC TANK FOR METAL HYDRIDE

FIELD OF THE INVENTION

The invention relates to an adiabatic tank for metal hydride.

BACKGROUND OF THE INVENTION

Hydrogen is used in many industrial fields, in particular as fuel or reagent (for example, for hydrogenation reactions). In this context, due to its volume in the gas state and its explosiveness in air, it is desirable for the hydrogen to be stored in a form that guarantees reduced size and safe containment.

The most common storage mode today consists in compressing the hydrogen gas. Said storage, called hyperbaric, is done at a pressure between 350 and 700 bar. Thus, the tanks employed must withstand high pressures and are therefore costly. Furthermore, the materials and the structure of these tanks are found to age poorly, raising problems of safety beyond a certain number of filling cycles.

Another storage mode consists in liquefying the hydrogen in cryogenic tanks at low temperature (−253° C.). One of the major drawbacks of this solution is the insulation of the tanks, especially in mass public applications. This is because despite efficient insulation, hydrogen contained in these tanks is reheated and is then converted to gas and escapes from the tank. This process, called boil-off, generates losses, precluding its application in closed premises.

The above two types of storage also require a large amount of energy to compress or cool the hydrogen. The energy balance of the use of hydrogen with these storage modes is therefore poor.

In recent years, hydrogen storage in the form of metal hydride has been investigated as an advantageous alternative, allowing for safer storage conditions and limited energy expenditure.

Some metals or alloys can reversibly incorporate hydrogen atoms in the crystal lattice. The hydrogen is absorbed/desorbed by these materials according to the temperature and pressure conditions. Examples include palladium (Pd), magnesium (Mg), $ZrMn_2$, $Mg_2Ni$, and alloys such as $Mg$—$Mg_2Ni$ and alanates.

As used here, depending on the step of the process, the term metal hydride also covers the metal partially or completely loaded with hydrogen.

A distinction is generally made between two types of metal hydride: heavy hydrides (mainly $LaNi_5$, and alloys such as ferro-titanium alloy or Ti—V—Cr based alloy) and light hydrides (mainly magnesium and lithium).

With heavy hydrides, the hydrogen is absorbed at ambient temperature and pressure. The exothermicity of the reaction is generally moderate (not exceeding 35 kJ/mol $H_2$). During use, the hydrogen is then desorbed at ambient temperature and pressure. The energy input required to use the hydrogen is reasonable. These heavy hydrides are therefore generally recommended for supplying hydrogen for fuel cells.

On the contrary, with light hydrides, the absorption of hydrogen by the light metal hydride requires a higher temperature (about 300° C. for $MgH_2$). This reaction is highly exothermic (75 kJ/mol $H_2$). The energy input required to initiate the hydrogen absorption reaction is therefore moderate. However, the absorption reaction is spontaneously interrupted if the heat generated is not removed. Furthermore, during use, the hydrogen desorption requires a high heat input, because the reaction is endothermic. The use of light hydrides therefore requires very accurate thermal management, during both the absorption and desorption of the hydrogen.

The absorption of one mole of $H_2$ liberates 75 kJ/mol, whereas its subsequent combustion liberates only 250 kJ/mol, hence a thermal efficiency of about 70% if the heat of reaction is not recovered. It is also necessary to consider the efficiencies of internal combustion engines (about 27%) or fuel cells (about 60%), which shows that using this storage mode offers no advantage in energy terms, unless the heat energy (75 kJ/mol) is recovered.

The present invention proposes to recover the heat energy of absorption and to use it for desorption in order to obtain a satisfactory overall efficiency.

However, this appears to be dangerous and ineffective. Thus, it has already been proposed, in patent EP 0 015 106, to construct a tank for metal hydride powder, comprising a molten salt medium for storing the heat of the exothermic absorption reaction and releasing this heat during the endothermic desorption.

However, due to their very low thermal conductivity (about 0.5 W/m.K), the salt fusion kinetics is 3 to 10 times slower compared to the materials of the present invention. Patent EP 0 015 106 excludes any possibility of operation at high thermal power levels. Furthermore, molten salts, in addition to their low thermal conductivity, are corrosive and even, in some cases, toxic or explosive. In case of accidental leakage, the reaction between the molten salt and the metal hydride is extremely violent. These salts also have a great difference in density between their solid and liquid phases, which cause substantial shrinkage cavities.

SUMMARY OF THE INVENTION

It is therefore the object of the present invention to propose a hydrogen storage tank that is safe, easy to manufacture, offering fast hydrogen absorption kinetics, minimizing variations in volume, and inexpensive in terms of material and energy.

To remedy the drawbacks of the known solutions, the present invention proposes a hydrogen storage tank using a light metal hydride, in particular magnesium hydride, compacted with a heat conducting matrix and combined with a system for the reversible storage of the heat of absorption of the hydrogen on the magnesium hydride, preferably a metal system such as magnesium alloy, for example.

For this purpose, the invention relates to a tank for storing hydrogen, comprising a hydrogen inlet and a hydrogen outlet in fluid communication with at least one solid body capable of the exothermic absorption and endothermic desorption of hydrogen, in which said at least one solid body is formed from a compacted material comprising light metal hydride and a heat conducting matrix, and in which said at least one solid body is in heat transfer relation with at least one heat recovery material, free of any salt or molten salt compound, and capable of absorbing the heat generated by the absorption of the hydrogen, and of restoring said absorbed heat to supply heat for the desorption of the hydrogen.

According to other embodiments:
    said at least one heat storage material may be a phase change material such that the heat generated by hydrogen absorption is stored in the phase change material when it changes from a first to a second phase, and that it is restored to supply heat for the hydrogen desorption when the phase change material changes from the second to the first phase;

the heat conducting matrix may be selected from the group consisting of expanded natural graphite, metal felts, nonoxide ceramics and copper foams lined with nonoxide ceramics;

the compact material may comprise 80 to 99% by weight of magnesium hydride and 20 to 1% by weight of expanded natural graphite;

the metal hydride may be selected from the group consisting of magnesium hydride and magnesium alloy hydride;

the phase change material may have a phase change temperature between a first absorption/desorption equilibrium temperature of the compacted material at a first operating pressure between 1 and 4 bar, and a second absorption/desorption equilibrium temperature of the compacted material at a second operating pressure between 10 and 20 bar;

the phase change material may have a thermal conductivity of at least 5 W/m.K, advantageously of at least 10 W/m.K, typically equal to about 100 W/m.K;

the phase change material may be a metal alloy;

the metal alloy may be selected from the group consisting of a magnesium alloy, a zinc alloy, a tin alloy, an indium alloy, a lead alloy, a strontium alloy, a bismuth alloy, an antimony alloy, an aluminum alloy, a silicon alloy, and a calcium alloy;

the magnesium metal alloy may be selected from the group consisting of a magnesium-zinc alloy, a magnesium-tin alloy and a magnesium-bismuth alloy;

the tank may comprise at least one tubular container bounded by a heat conducting wall, in which is placed at least one solid body formed from a compacted material comprising metal hydride and a heat conducting matrix, said at least one container being arranged in a vessel comprising the heat storage material;

the tank may comprise a plurality of tubular containers arranged in a bundle in the vessel and around which the heat storage material is arranged;

the tank may comprise a plurality of solid bodies stacked inside said at least one container, along at least one stacking direction;

each solid body may have the shape of a pellet comprising a central hole;

a solid body may comprise at least two parts combined with means for thrusting each part into thermal contact with the container wall;

the tank may be further equipped with a heat exchanger arranged so as to transfer the heat from the pellets or half-pellets to the heat storage material and vice versa;

the heat exchanger may comprise metal plates stacked alternately with the pellets or two half-pellets;

the tank may comprise an inert gas feed arranged to ensure the presence of the inert gas in contact with areas of the heat recovery material, such as a phase change material, that may be exposed to air; and said at least one heat storage material may comprise at least two reagents capable of reacting with one another during an endothermic reaction using the heat from hydrogen absorption to generate at least one reaction product, said reaction product being capable of reacting during an exothermic reaction supplying heat for desorbing the hydrogen to generate said at least two reagents.

The use of a light metal hydride compacted with a heat conducting matrix serves to use a system for the reversible storage of the heat of absorption of the hydrogen, and to obtain a fast absorption kinetics (about a few minutes). The storage system of the invention is also lightweight, inexpensive in terms of energy, safe, and minimizes variations in volume.

The invention further relates to the use of a compacted material comprising light metal hydride and a heat conducting matrix for storing hydrogen in a tank comprising a heat storage material in heat transfer relation with the compacted material.

BRIEF DESCRIPTION OF THE DRAWINGS

Other features of the invention will be stated in the detailed description that follows, with reference to the appended figures in which, respectively.

DETAILED DESCRIPTION OF THE INVENTION

Figure 1A:
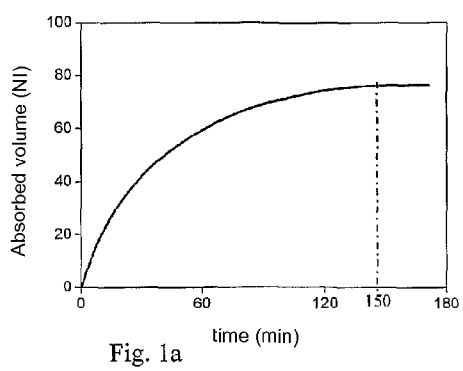
FIGS. 1a to 1c show three comparative diagrams of the hydrogen absorption kinetics, respectively by magnesium hydride powder, by a compacted magnesium hydride material comprising 5% by weight of expanded natural graphite combined with a heat exchanger, and by a compacted magnesium hydride material comprising 20% by weight of expanded natural graphite.

In the rest of the description, the term "solid body" is used as opposed to a fluid body such as a powder.

The term "compacted material" as used below means a material whose density is significantly higher than that of the raw materials in the powder state. This material is obtained in particular by compressing a mixture of raw materials in powder form. The porosity is 0.7 for $MgH_2$ powder and can be up to 0.3 after compaction at $10^8$ Pa.

The invention relates mainly, but not exclusively, to magnesium hydride $MgH_2$, because it has many advantages: magnesium is recyclable, biocompatible, abundant and inexpensive. Magnesium hydride also has a high hydrogen storage capacity (7.6% by weight) and a volumetric density close to that of liquid hydrogen.

According to the invention, magnesium hydride $MgH_2$ is activated by co-grinding magnesium hydride with a transition metal, a transition metal alloy or a transition metal oxide, preferably introduced in proportions between 1 and 10 atomic % of the mixture.

The term "transition metal" as used here means chemical elements having a partially filled d sublayer in the atomic state or which form at least one ion with a partially filled d sublayer. The term relates in particular to the transition metals V, Nb, Ti, Cr and Mn and their carbides or subcarbides.

Activated magnesium hydride is advantageously in the form of a very fine powder, with a particle size distribution between 1 and 10 μm.

This activation can be obtained in particular by co-grinding with an alloy having a face-centered cubic structure based on titanium, vanadium and either chromium or manganese. The powders obtained have very good performance in terms of hydrogen absorption and desorption kinetics, but are nevertheless highly reactive and may ignite spontaneously in air.

The magnesium hydride thus activated is mixed with a heat conducting matrix selected for example but not exclusively from expanded graphite, expanded natural graphite (ENG), graphite fibers, metal felts, nonoxide ceramics and lined copper foams.

The expression "heat conducting matrix" means a material mixed with the powder and promoting the cohesion of the product obtained by compaction and heat conduction.

ENG is a form of graphite modified by chemical and heat treatment. Graphite is advantageous because it is hydrophobic, refractory and a good conductor of heat.

ENG is particularly effective because it is in the form of small millimeter-sized flakes, imparting a strongly anisotropic property, and favoring the conduction of heat over long distances, at a much higher scale than that of the magnesium grains.

ENG particles are advantageously in the form of elongated vermicules, having a diameter of about 500 μm and a length of a few millimeters.

Under the effect of uniaxial compaction, the vermicules are oriented substantially perpendicular to the compression axis. This gives the composite material highly anisotropic thermal behavior, and promotes the conduction of heat perpendicular to the compression axis (about 5 to 15 W/m.K, depending on the proportion of ENG).

The force exerted during compaction is selected in particular according to the desired porosity in the material. For information, a compressive force of about 1 t/cm$^2$ is suitable for obtaining pellets of material (FIG. 2) having a porosity of about 0.3.

The proportion of expanded natural graphite in the composition represents a compromise between increasing the thermal conductivity and lowering the mass absorption capacity, since ENG does not absorb hydrogen.

According to the invention, the compacted material comprises 75 to 99% by weight of magnesium hydride and 25 to 1% by weight of expanded natural graphite.

ENG allows better management of the heat flux during the exothermic hydriding operation, and hence a significant reduction in the hydrogen reloading time.

In the rest of the description, the compacted material of the solid body is denoted MgH$_2$/ENG (X%), where X is the percentage of matrix, such as ENG, employed.

The material obtained has a lower porosity than the powder, thereby increasing its volumetric hydrogen storage capacity. Its compact form gives it mechanical strength that facilitates its use and allows machining to the desired shape.

Furthermore, the hydriding of a solid body obtained by the compaction of MgH$_2$/ENG (X%) is only accompanied by a slight increase in volume.

Moreover, against all expectations, after compaction, the composite can be handled in air, without any risk of spontaneous ignition even if prepared with activated magnesium hydride. This allows safer and easier loading of the tanks.

Figure 1B:
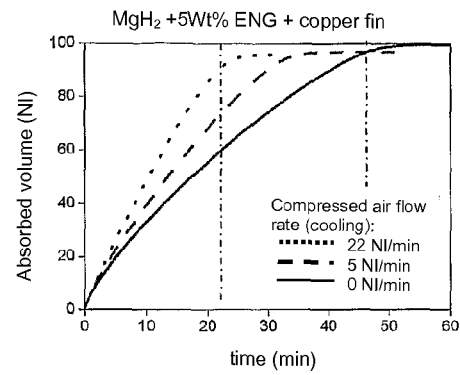
Figure 1C:
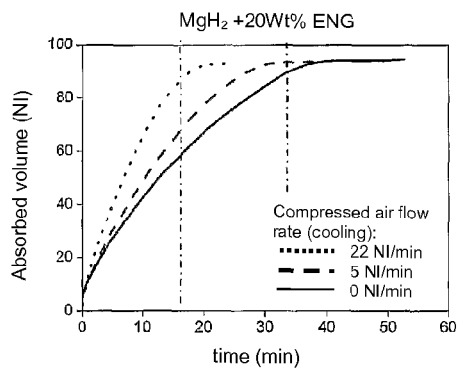

FIGS. 1a to 1c show three comparative diagrams of the hydrogen absorption kinetics by uncompacted magnesium hydride powder (FIG. 1a), by a compacted magnesium hydride material comprising 5% by weight of ENG (FIG. 1b) and by a compacted magnesium hydride material comprising 20% by weight of ENG (FIG. 1c). Graph 1a is given for a condition of natural removal of the heat of absorption of the hydrogen by the metal hydride, or: 0 Nl per minute (normoliter: the normoliter represents one liter of gas in normal temperature and pressure conditions). Graphs 1b and 1c are given for three conditions of removal of the heat of absorption of the hydrogen by the metal hydride: 0 Nl per minute, 5 Nl per minute and 22 Nl per minute.

FIG. 1a shows that magnesium hydride powder alone is slowly hydrided. Typically, its maximum absorption capacity is reached in about 150 minutes.

The compacted material employed for FIG. 1b was placed in a heat transfer relation with a heat exchanger.

FIG. 1b shows that the maximum absorption capacity of the compacted magnesium hydride material comprising 5% by weight of expanded natural graphite is reached in about 50 minutes without cooling. When cooling is maximal (22 Nl/minute), the maximum capacity is reached in about 25 minutes only.

A comparison of FIGS. 1a and 1b shows that the solid body of the invention has a radial thermal conductivity much higher than that obtained with a magnesium powder.

For a percentage of ENG between 5 and 10%, it is preferable to use a heat exchanger to promote the heat exchanges. In fact, the MgH$_2$/ENG (5%) material alone allows for a loading time of about one hour (compared to several hours with magnesium hydride powder). When the MgH$_2$/ENG (5%) material is combined with a heat exchanger, the loading time is reduced to about 30 minutes.

The heat exchanger employed comprises metal fins (copper) stacked alternately with pellets or half-pellets of MgH$_2$/ENG (5%) along at least one stacking direction.

However, this heat exchanger requires the use, in the tank, of a mass of copper equivalent to the mass of magnesium of the pellets. In other words, half of the mass is represented by copper which does not store hydrogen.

Apart from its high price, copper, if unprotected, for example, by a ceramic coating, can ultimately react with magnesium to form a binary alloy MgCu; this reduces the amount of magnesium available to store the hydrogen.

FIG. 1c shows that the maximum absorption capacity of the compacted magnesium hydride material comprising 20% by weight of expanded natural graphite is reached in about 40 minutes without cooling. When cooling is maximal (22 Nl/minute), this volume is filled in about 20 minutes only.

Thus, the thermal conductivity is improved by increasing the percentage of ENG. The thermal conductivity of MgH$_2$/ENG (5%) is about 4 W/m.K, while the thermal conductivity of MgH$_2$/ENG (20%) is about 15 W/m.K.

This increase is such that a heat exchanger is no longer necessary for a percentage of ENG substantially equal to 20%. This advantage offsets the decrease in mass absorption capacity due to the percentage of ENG. In fact, at equal mass, it is possible to use twice as much MgH$_2$/ENG (20%) material as MgH$_2$/ENG (5%) material.

The size of the pellets also has a considerable effect on the hydrogen loading/unloading time, which depends on the characteristic heat diffusion length of the material. Thus, for a pellet according to the invention shown in FIG. 2, a characteristic length $L_C$ is defined as being the distance equal to the outside radius $R_E$ of the pellet less the radius $R_T$ of the central hole. A pellet having an outside radius $R_E$ of 9 cm and a central hole having a radius $R_T$ of 1 cm has a characteristic length $L_C$=8 cm.

Figure 3:
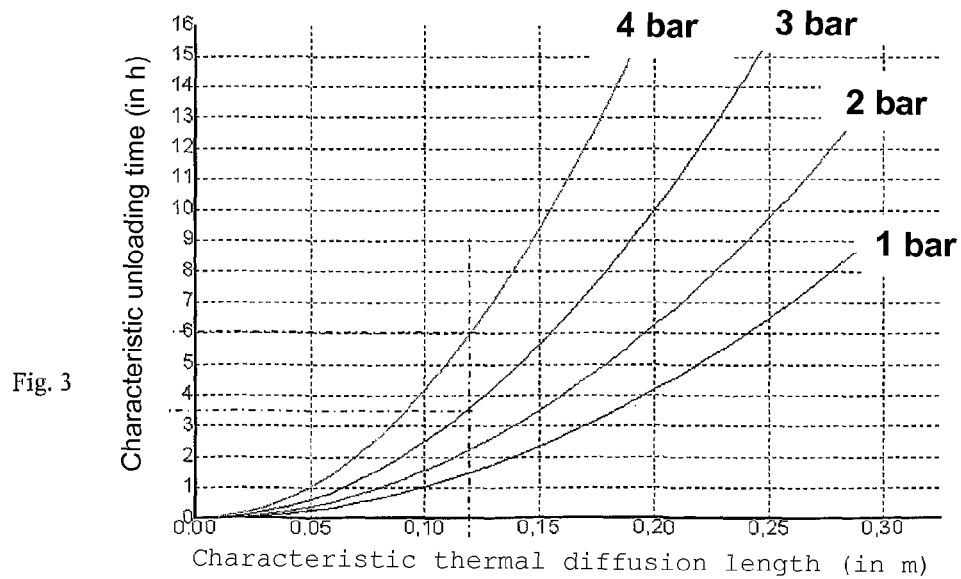
FIG. 3 shows a diagram of the hydrogen desorption kinetics with a pellet of compacted magnesium hydride comprising 20% by weight of expanded natural graphite, as a function of the characteristic length of the pellet and of the desorption pressure.

FIG. 3 shows the unloading times calculated as a function of this characteristic length and of the pressure at the tank outlet. These hydrogen desorption times are those obtained when the thermal conductivity of the hydrogen storage material is the factor limiting the reaction. To preserve a loading/unloading (or absorption/desorption) time of a few hours, it is therefore preferable to preserve a limited characteristic pellet length. Thus, to optimize the efficiency of the tank in terms of loading/unloading time, it is preferable to have a plurality of stacks of pellets having a reduced characteristic length, arranged in bundles, rather than a single stack of pellets having a large characteristic length.

For example, FIG. 3 shows that a pellet of $MgH_2$/ENG (20%) with a characteristic length of 12 cm would serve to unload the tank in 6 h for an outlet pressure of 4 bar, or 3h30 minutes for a pressure of 3 bar, which is compatible with a day/night operating cycle.

The invention proposes the use of such a compacted material, comprising metal hydride and a heat conducting matrix, in a heat transfer relation with a heat recovery material, free of salt or molten salt compounds, and capable of absorbing the heat generated by the absorption of the hydrogen, and of restoring this absorbed heat to supply heat for the desorption of the hydrogen.

Preferably, the invention proposes the use of such a compacted material, comprising metal hydride and a heat conducting matrix, in a heat transfer relation with a phase change material.

According to the invention, the phase change material used is preferably a metal alloy. Thus, during the hydrogen feed, the heat generated by the absorption of the hydrogen is stored in the phase change material 42 when it changes from a first to a second phase. Subsequently, during use, the heat stored is released when the phase change material changes from the second to the first phase. This supplies the energy required for the endothermic desorption.

Preferably, the material is selected to change from the solid phase to the liquid phase and vice versa. This serves to ensure high heat conduction and a reasonable vessel volume.

Evaporation, sublimation and an endothermic reaction without phase change can also be employed.

A comparative experiment was carried out to illustrate the difference in hydrogen loading speed by using either a phase change material based on salts, or a phase change material comprising a metal alloy according to the invention.

A reactor comprises an internal tank having a diameter of 10 cm filled with composite material $MgH_2$+20% ENG in the dehydrided state. The inner tank is introduced into an insulated cylinder and filled in succession with metal alloy having the atomic composition Mg83%—Zn27% and salts having the molar composition: NaCl 60%—$FeCl_2$ 40%. The heat storage material is preheated to 330° C. When a hydrogen pressure of 7 bar is applied, the temperature of the hydride suddenly rises to 360° C. and the fusion front propagates in the phase change material. The loading times are respectively more than 2 h with the salts, and only 15 minutes with the metal alloy.

Figure 4:
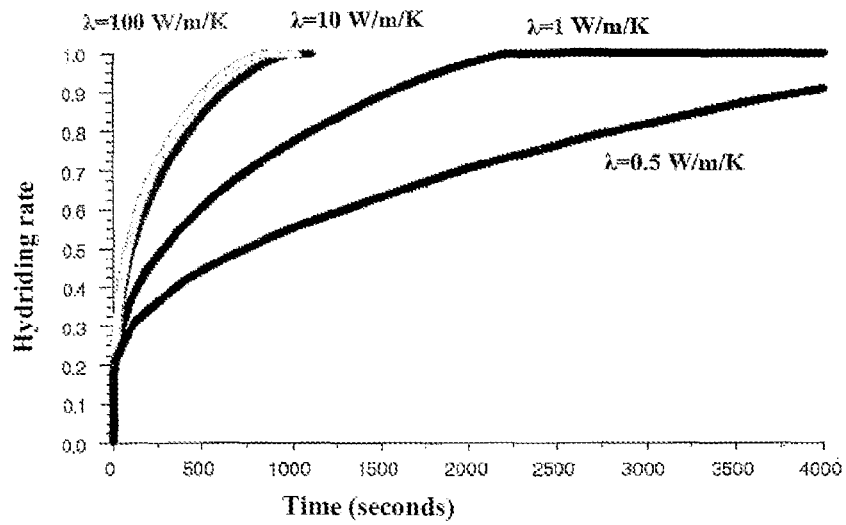
FIG. 4 shows a diagram of the absorption kinetics at a pressure of 10 bar as a function of the thermal conductivity of the phase change material, for a pellet of $MgH_2$/ENG (20%), at a characteristic length of 5 cm.

In FIG. 4, the absorption rates at a pressure of 10 bar have been calculated as a function of the thermal conductivity $\lambda$ of the phase change material, for a pellet of compacted magnesium hydride comprising 20% by weight of ENG, and having a characteristic length of 5 cm.

The value of 0.5 W/m.K typically corresponds to a salt. That of a molten metal is higher than 100 W/m.K. The curves show that above a value of 10 W/m.K, the thermal conductivity of the hydride becomes the limiting factor.

The phase change material employed has a thermal conductivity of at least 5 W/m.K, advantageously at least 10 W/m.K, typically equal to about 100 W/m.K. It is also selected to have a maximum latent heat of fusion, preferably above 200 kJ/kg.

The heat generated during hydrogen absorption is stored in the phase change material and subsequently used to supply heat to the compacted material for the desorption of the hydrogen.

The use of the compact material $MgH_2$/ENG (X%) in combination with a phase change material allows for effective and rapid hydrogen storage, even if the absorption of the hydrogen on the magnesium hydride is highly exothermic.

Figure 5:
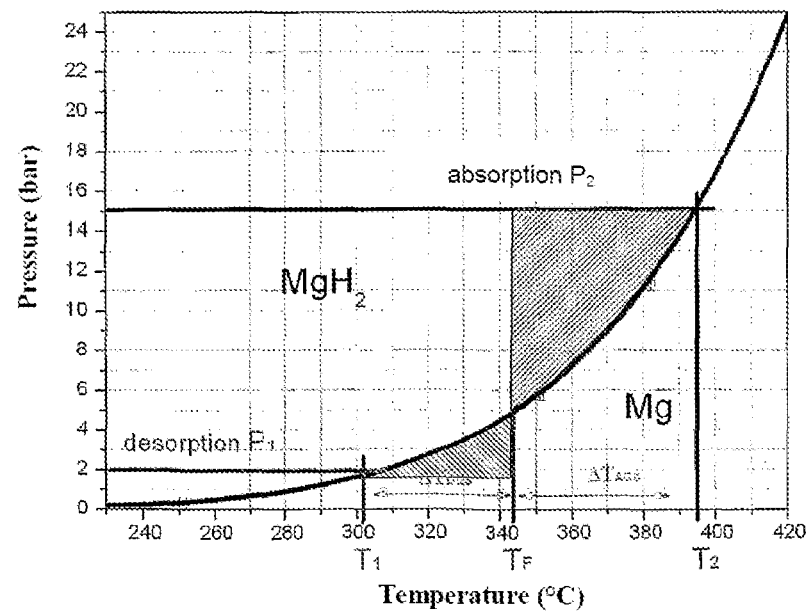
FIG. 5 shows a diagram of the pressure=f (Temperature) equilibrium curve of the reaction of magnesium hydride with hydrogen.

FIG. 5 shows a diagram of the thermodynamic equilibrium curve of hydrogen pressure=f (Temperature) of the reaction of magnesium hydride with hydrogen.

In general, the feed pressures $P_2$ required are typically about 10 to 20 bar (absorption) and the operating pressures $P_1$ required are typically above 1 to 4 bar (desorption). These feed pressures are those obtained by the use of a conventional electrolyzer, powered for example by photovoltaic cells. These operating pressures are conventional for hydrogen feed in internal combustion engines, turbines and fuel cells.

In the case of magnesium hydride, this gives a desorption temperature $T_1$ between 280° C. and 320° C. and an absorption temperature $T_2$ between 340° C. and 400° C.

In practice, when a given hydrogen pressure $P_2$ is applied to store the hydrogen, the exothermic absorption reaction leads to a sudden temperature rise in the entire $MgH_2$/ENG (X%) material to reach the corresponding absorption/desorption equilibrium temperature $T_2$. In the neighborhood of the equilibrium curve, the reaction kinetics is very slow, and if the heat of reaction is not effectively removed, the tank loading time may reach several tens of hours. Conversely, when the pressure is lowered to $P_1$ to use the hydrogen, a sudden drop in temperature is observed, down to the absorption/desorption equilibrium temperature $T_1$. The hydrogen flow rate measured at the tank outlet is then proportional to the heating power injected into the hydride.

According to the invention, the phase change material has a melting point $T_f$ between $T_1$ and $T_2$. To avoid favoring one reaction direction over the other (in terms of loading or unloading time), $T_f$ should be as close as possible to $(T_1+T_2)/2$.

The phase change material employed is preferably a metal alloy selected from alloys based on magnesium, zinc, tin, indium, lead, strontium, bismuth, antinomy, aluminum, silicon, and calcium.

Preferably, the magnesium alloy is selected from the eutectics of the Mg—Zn system for their high latent heat of fusion and their melting point lying between the above temperatures $T_1$ and $T_2$.

The phase change material may also comprise elements such as Sn, Si, Pb, Bi, Sb, Al, Ca, etc., which can be used as minority addition elements to adjust the phase change temperatures.

Mg—Sn and Mg—Bi alloys are also usable.

The presence of a phase change material with high thermal conductivity (at least 5 W/m.K, advantageously at least 10 W/m.K, typically equal to about 100 W/m.K) improves the rate of hydrogen absorption by the compact $MgH_2$/heat conducting matrix material.

For storing the hydrogen, hydrogen gas at a storage pressure $P_2$, for example, 15 bar, is supplied to the solid body of the invention.

According to the curve in FIG. 5, and considering the highly exothermic reaction of the hydriding of Mg/ENG (X%) to MgH$_2$/ENG (X%), the temperature of the material suddenly rises to T$_2$. Heat is transferred to the phase change material.

The heat transfer relation is preferably obtained by placing a sealed wall of good heat conducting material between the hydrogen storage material and the heat storage material.

As the temperature of the hydride rises above the temperature T$_f$, the phase change material starts to melt. A fusion front then propagates from the wall between the hydride and the phase change material. The fusion front propagates rapidly in the phase change material. Since said material is selected to have high thermal conductivity, the temperature gradient in the phase change material is low, enabling the temperature Ti of the interface wall to remain close to Tf, and hence to preserve a high reaction driving force.

Since the heat of reaction is rapidly removed, the solid body is very quickly loaded. The amount of phase change material must be sufficient for the corresponding latent heat to allow the storage of all the heat generated by the hydrogen absorption reaction.

To use hydrogen, the hydrogen pressure is lowered to the operating pressure P$_1$.

As the pressure decreases, the temperature in the MgH$_2$/ENG (X%) decreases to the temperature T$_1$. Without energy input, the reaction would stop because desorption is endothermic.

However, since the phase change material is selected to have high thermal conductivity, it rapidly transfers heat to the MgH$_2$/ENG (X%).

The phase change material begins to solidify and the desorption reaction continues.

Figure 6:
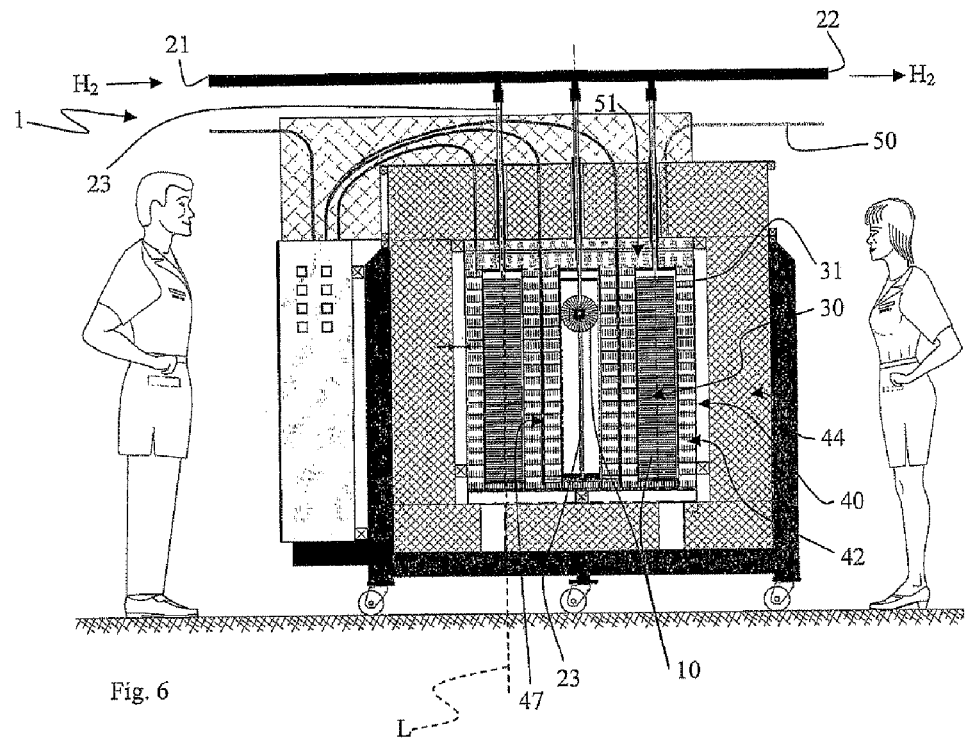
FIG. 6 shows a schematic side cross section of a first embodiment of a hydrogen storage tank of the invention.
Figure 7:
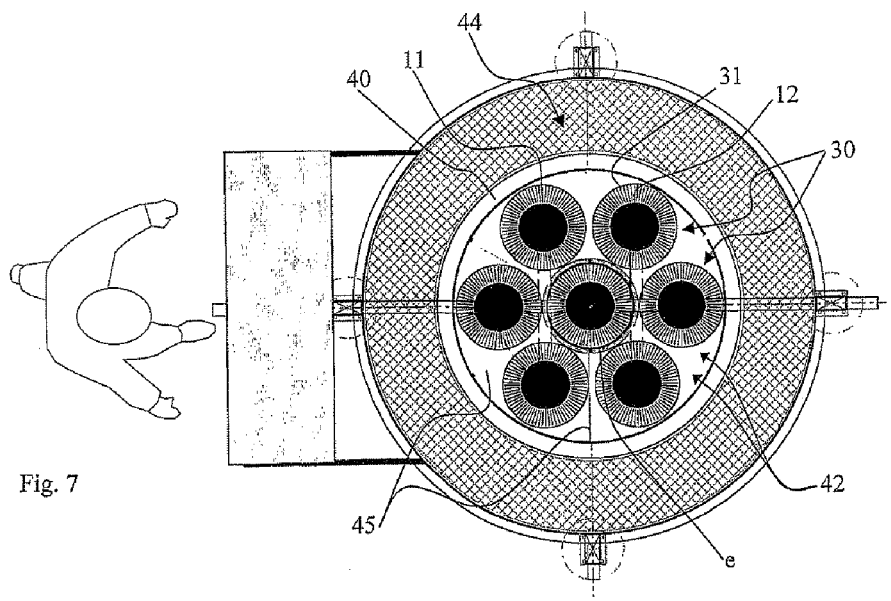
FIG. 7 shows a schematic plan cross section of the tank in FIG. 6.

A first embodiment of a hydrogen storage tank of the invention is shown in FIGS. 6 and 7.

The tank 1 comprises a plurality of solid bodies 10 according to the invention, in fluid communication with a hydrogen inlet 21 and a hydrogen outlet 22.

The solid bodies are stacked inside the tubular containers 30, along a stacking direction L. The containers are arranged in a vessel 40 comprising phase change material 42.

Figure 2:
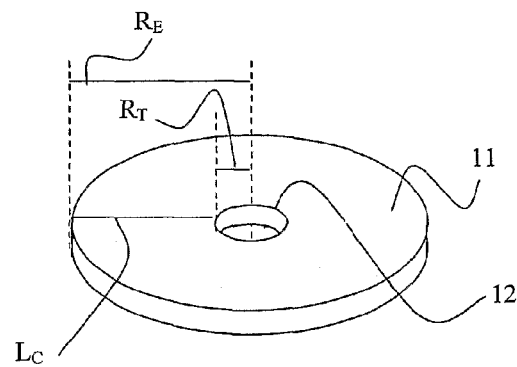
FIG. 2 shows a schematic perspective view of a pellet of a solid body for storing hydrogen according to the invention.
Figure 8:
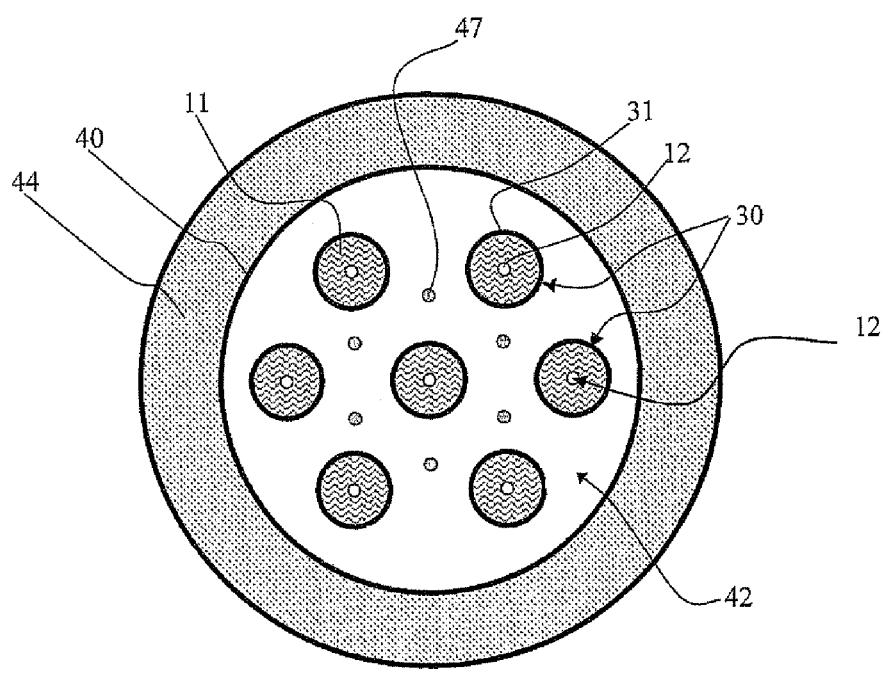
FIG. 8 shows a schematic plan cross section of a second embodiment of a hydrogen storage tank of the invention.

In the embodiments in FIGS. 6 to 8, each solid body 10 has the shape of a pellet 11 comprising a central hole 12 (see FIGS. 2, 6 and 7).

Each solid body is in fluid communication with the hydrogen inlet 21 and hydrogen outlet 22 via at least one tube 23 that is porous to hydrogen and placed in the central hole. The tube may be porous by the presence of holes in its wall, or by the material selected to manufacture the tube.

The solid bodies 10 are in a heat transfer relation with the phase change material 42.

The heat transfer relation is preferably obtained by means of the wall 31 of each container 30. For manufacturing the containers 30, the material used should be a good heat conductor, resistant to hydrogen and have a melting point above the maximum service temperature of the phase change material. A stainless steel should preferably be used.

Each container 30 has a different expansion coefficient from that of the solid bodies. Thus, when the solid bodies are pellet shaped, in one single piece, the container 30 containing them may expand more than the pellets. In this case, the heat transfer relation is altered because the pellets are no longer in contact with the wall 31 of the container 30.

To ensure continuous heat transfer between the solid bodies 10 and the heat storage material, one embodiment of the invention provides for each solid body to be in at least two parts, preferably two half-bodies.

If each solid body is selected to have an overall pellet shape, the solid body preferably comprises two half-pellets each provided with a recess such that, by combining two half-pellets in the same plane, a central hole 12 is arranged. If each solid body comprises more than two parts, the recess is such that, by joining each part in the same plane, a central hole 12 is arranged.

Furthermore, the invention provides means for thrusting each part of the solid body against the wall 31 of the container 30 containing them. Preferably, the thrusting means is a compression spring means, placed between each part of the solid body. For example, the thrusting means is a graphite cord or a cushion spring which compresses each part against the wall 31.

The compacted MgH$_2$/ENG (X%) material may not be pellet shaped. The or each container may comprise a solid body having an overall tube shape provided with central slit. The or each solid body is then in fluid communication with a hydrogen inlet and hydrogen outlet, optionally via at least one tube porous to hydrogen and arranged in the central slit. Each tube may also comprise a plurality of parts combined with means for thrusting each part of the tube against the wall 31 of the container 30 containing them.

The tank may also be provided with a heat exchanger arranged to transfer heat from said compacted MgH$_2$/ENG (X%) material to the phase change material.

According to a first embodiment shown in FIGS. 6 and 7, the tubular containers 30 are arranged in a bundle. The phase change material 42 is arranged around and between the containers 30.

In order to improve the heat transfers, the tank may further comprise heat conducting plates 45 arranged between the containers and extending in thermal contact with the phase change material.

This configuration, shown in FIG. 7, serves, on the one hand, to conduct the heat between two containers 30 and, on the other hand, to arrange an annular space e between the central container and the other containers. This space e is then filled with phase change material 42 and allows effective heat transfer between the central container and the overall phase change material 42 of the vessel 40.

Another embodiment is shown in FIG. 8, in which the containers are arranged in a loose bundle. Thus, the containers are not in contact or substantially in contact with one another. Their respective spacing is sufficient for a predefined quantity of phase change material 42 to be positioned around each container 31.

When the compacted material comprises 90 to 95% by weight of magnesium hydride and 10 to 5% by weight of expanded natural graphite, the tank is preferably provided with an additional heat exchanger arranged so as to transfer the heat from the pellets to the phase change material and vice versa.

This heat exchanger may comprise metal plates stacked alternately with the pellets. It may also comprise coolant ducts arranged to collect the heat from the pellets and to distribute it to the phase change material.

When the compacted material comprises about 80% by weight of magnesium hydride and about 20% by weight of expanded natural graphite, the preceding heat exchanger is useful but unnecessary.

To avoid heat losses to the exterior of the tank, said tank comprises a layer of insulating material 44 arranged to thermally insulate the assembly.

The insulation is selected to have a thermal conductivity not exceeding about 0.1 W/m.K.

To offset the inevitable heat losses, including with a highly efficient insulation, the tank of the invention may comprise means 47 for heating the phase change material. Said means may, for example, be an electric resistance heater.

This serves to maintain the phase change material at a sufficient temperature to preserve the heat that it has stored during the phase change.

For a solid/liquid phase change material, the heating means serves to maintain the material in fusion, in the liquid state.

The tank may also comprise at least one hydrogen pressure sensor and one safety valve which opens above a predefined pressure and allows the removal of the hydrogen to a discharge tank (not shown). These devices also ensure proper hydrogen feed.

Although the compacted $MgH_2$/ENG (X%) material is not inflammable in air, the surface of the solid body may be progressively oxidized. It is therefore preferable for each container to be airtight. Furthermore, the hydrogen storage tank of the invention may comprise an inert gas 51 feed 50 arranged to ensure the presence of the inert gas (such as argon or helium) in contact with zones of the heat recovery material, here the phase change material, which are liable to be exposed to air. The inert gas is preferably in overpressure compared to atmospheric pressure.

A pressure sensor may be provided within this inert gas. In this way, if one or more containers 30 leaks and hydrogen escapes into the heat storage material, said hydrogen will diffuse toward the surface through the heat storage material without combining with said material. In this way, the hydrogen will blend with the inert gas and create an overpressure. The pressure sensor will then detect this overpressure and stop the operation of the tank. A safety installation (not shown) can then be activated to remove the hydrogen to a discharge tank and resupply the tank with inert gas.

The construction of a 250 kg magnesium hydride tank can be considered according to the embodiment shown in FIG. 8.

The geometry used is a cylindrical vessel comprising seven identical cylindrical containers, placed in a loose bundle.

The magnesium hydride is placed in each container in the form of pellets 11 perforated at their center to allow the passage of hydrogen.

The amount of heat generated by the reaction in such a tank is 555 MJ.

The phase change material selected is eutectic Mg—Zn alloy with a majority of magnesium. The quantity of alloy used to store the heat of reaction is 2340 kg (840 liters).

To store 250 kg of $MgH_2$ in the above seven containers, the stacking height of the pellets is about 1.5 m and the outside diameter of the vessel should be 1 m.

By placing a layer of standard insulation (thermal conductivity not exceeding about 0.1 W/m.K) 20 cm thick, the convection losses on the outer surface of the vessel amount to about 2% of the energy stored in hydrogen form for 24 hours.

The tank of the invention is more particularly intended for stationary applications: buffer storage of electricity generated in slack hours or by renewable energies, storage of very large amounts of hydrogen for chemical use, etc.

Many variants and alternative can be considered while remaining within the scope of the invention and in particular:

the cylindrical geometry of the containers, the vessel, and/or the entire tank, serves to optimize the quantities of material with regard to the volume. However, the tank, and in particular the vessel and the container or containers, may have other geometries, such as a polygonal cross section (square, rectangular hexagonal, shapes normalized for handling, for example, those of containers intended for land and sea transport (20 feet or 40 feet), etc.);

the containers may be arranged at random in the vessel;

the tank may comprise an auxiliary means for heating the solid bodies for storing hydrogen. Said auxiliary means serves to contend with any insufficiency of latent heat, in particular when the tank has not been used for a long period;

the heat conducting matrix may be composed of nonoxide ceramics such as TiN or AlN;

the metal alloy of the phase change material may be ternary or quaternary;

the tank of the invention may also use the enthalpy of the heats of reaction between condensed phases, that is to say, during the change from a liquid phase to a gas phase and vice versa. The phase change may thus be the evaporation of a substance compatible with the application. The heat of evaporation of the chemical compounds and elements is much higher than their heat of fusion. Thus for a metal like zinc, the ratio between these heats is nearly 18, and is 16 for Mg. Waxes can be used, but they require a volume much larger than that of the Mg—Zn alloy, and high pressure tanks for a comparable mass of product;

volatile systems may preferably be used as "coolants" in order to delocalize the heat storage if necessary;

solid materials capable of sublimating may also be used as phase change material.

The invention claimed is:

1. A hydrogen storage tank, comprising a hydrogen inlet and a hydrogen outlet in fluid communication with at least one solid body capable of the exothermic absorption and endothermic desorption of hydrogen, characterized in that said at least one solid body is formed from a compacted material comprising light metal hydride and a heat conducting matrix, and in that said at least one solid body is in a heat transfer relation with at least one heat recovery material, free of any salt or molten salt compound, and capable of absorbing the heat generated by the absorption of the hydrogen, and of restoring said absorbed heat to supply heat for the desorption of the hydrogen.

2. The hydrogen storage tank as claimed in claim 1, in which said at least one heat recovery material is a phase change material such that the heat generated by hydrogen absorption is stored in the phase change material when it changes from a first to a second phase, and that it is restored to supply heat for the hydrogen desorption when the phase change material changes from the second to the first phase.

3. The hydrogen storage tank as claimed in claim 1, in which the heat conducting matrix is selected from the group consisting of expanded natural graphite, metal felts, nonoxide ceramics and copper foams lined with nonoxide ceramics.

4. The hydrogen storage tank as claimed in claim 3, in which the compacted material comprises 75 to 99% by weight of magnesium hydride and 25 to 1% by weight of expanded natural graphite.

5. The hydrogen storage tank as claimed in claim 1, in which the metal hydride is selected from the group consisting of magnesium hydride and magnesium alloy hydride.

6. The hydrogen storage tank as claimed in claim 2, in which the phase change material has a phase change temperature between a first absorption/desorption equilibrium temperature ($T_1$) of the compacted material at a first operating pressure ($P_1$) between 1 and 4 bar, and a second absorption/desorption equilibrium temperature ($T_2$) of the compacted material at a second operating pressure ($P_2$) between 10 and 20 bar.

7. The hydrogen storage tank as claimed in claim 6, in which the phase change material has a thermal conductivity of at least 5 W/m.K.

8. The hydrogen storage tank as claimed in claim 7, in which the phase change material is a metal alloy.

9. The hydrogen storage tank as claimed in claim 8, in which the metal alloy selected from the group consisting of a magnesium alloy, a zinc alloy, a tin alloy, an indium alloy, a lead alloy, a strontium alloy, a bismuth alloy, an antimony alloy, an aluminum alloy, a silicon alloy, and a calcium alloy.

10. The hydrogen storage tank as claimed in claim 9, in which the magnesium metal alloy is selected from the group consisting of a magnesium-zinc alloy, a magnesium-tin alloy and a magnesium-bismuth alloy.

11. The hydrogen storage tank as claimed in claim 1, comprising at least one tubular container bounded by a heat conducting wall, in which is placed at least one solid body formed from a compacted material comprising metal hydride and a heat conducting matrix, said at least one container being arranged in a vessel comprising the heat storage material.

12. The hydrogen storage tank as claimed in claim 11, comprising a plurality of tubular containers arranged in a bundle in the vessel and around which the heat storage material is arranged.

13. The hydrogen storage tank as claimed in claim 11, comprising a plurality of solid bodies stacked inside said at least one container, along at least one stacking direction.

14. The hydrogen storage tank as claimed in claim 13, in which each solid body has the shape of a pellet comprising a central hole.

15. The hydrogen storage tank as claimed in claim 11, in which a solid body comprises at least two parts combined with means for thrusting each part into thermal contact with the container wall.

16. The hydrogen storage tank as claimed in claim 14, in which the tank is further equipped with a heat exchanger arranged so as to transfer the heat from the pellets to the heat storage material and vice versa.

17. The hydrogen storage tank as claimed in claim 16, in which the heat exchanger comprises metal plates stacked alternately with the pellets.

18. The hydrogen storage tank as claimed in claim 1, comprising an inert gas feed arranged to ensure the presence of the inert gas in contact with areas of the heat recovery material that may be exposed to air.

19. The hydrogen storage tank as claimed in claim 1, in which said at least one heat storage material comprises at least two reagents capable of reacting with one another during an endothermic reaction using the heat from hydrogen absorption to generate at least one reaction product, said reaction product being capable of reacting during an exothermic reaction supplying heat for desorbing the hydrogen to generate said at least two reagents.

20. The use of a compacted material comprising light metal hydride and a heat conducting matrix for storing hydrogen in a tank comprising a heat storage material in a heat transfer relation with the compacted material.

* * * * *